(12) United States Patent
Ljungblad

(10) Patent No.: US 12,722,204 B2
(45) Date of Patent: Sep. 1, 2026

(54) SPOT PREHEATING

(71) Applicant: Freemelt AB, Mölndal (SE)

(72) Inventor: Ulric Ljungblad, Mölndal (SE)

(73) Assignee: Freemelt AB, Mölndal (SE)

( * ) Notice: Subject to any disclaimer, the term of this patent is extended or adjusted under 35 U.S.C. 154(b) by 449 days.

(21) Appl. No.: 17/426,673

(22) PCT Filed: Jan. 29, 2020

(86) PCT No.: PCT/EP2020/052167

§ 371 (c)(1),
(2) Date: Jul. 29, 2021

(87) PCT Pub. No.: WO2020/157133

PCT Pub. Date: Aug. 6, 2020

(65) Prior Publication Data

US 2022/0105567 A1 Apr. 7, 2022

Related U.S. Application Data

(60) Provisional application No. 62/797,964, filed on Jan. 29, 2019.

(51) Int. Cl.
*B22F 10/362* (2021.01)
*B22F 10/28* (2021.01)
(Continued)

(52) U.S. Cl.
CPC ............ *B22F 10/362* (2021.01); *B22F 10/28* (2021.01); *B22F 10/368* (2021.01); *B22F 12/13* (2021.01);
(Continued)

(58) Field of Classification Search
CPC ........ B22F 10/362; B22F 12/41; B22F 12/13; B22F 10/28; B22F 10/368; B22F 2203/11; B33Y 10/00; B33Y 40/10
(Continued)

(56) References Cited

U.S. PATENT DOCUMENTS

2005/0186538 A1* 8/2005 Uckelmann ............ B33Y 80/00
433/201.1
2006/0054079 A1* 3/2006 Withey ................ C22C 19/057
117/108
(Continued)

FOREIGN PATENT DOCUMENTS

CN 101479064 A 7/2009
CN 105499567 A 4/2016
(Continued)

*Primary Examiner* — Elizabeth M Kerr
*Assistant Examiner* — Simpson A Chen
(74) *Attorney, Agent, or Firm* — MEDLER FERRO WOODHOUSE & MILLS PLLC

(57) ABSTRACT

The present invention relates to a heating method for preparing a powder bed for subsequent processing by irradiating the powder bed with an electron beam from an electron source. The electron source may be designed for fast moving of the electron beam to different heating positions at the powder bed comprising the step, local heating of at least two powder bed heating positions by successive resting of said electron beam at the at least two powder bed heating positions. By jumping between local preheating positions at the powder bed before the powder is fused, charged powder can be prevented from levitation and scattering from the powder bed.

27 Claims, 2 Drawing Sheets

(51) Int. Cl.

| | |
|---|---|
| ***B22F 10/368*** | (2021.01) |
| ***B22F 12/13*** | (2021.01) |
| ***B22F 12/41*** | (2021.01) |
| ***B33Y 10/00*** | (2015.01) |
| ***B33Y 40/10*** | (2020.01) |

(52) U.S. Cl.

CPC .............. *B22F 12/41* (2021.01); *B33Y 10/00* (2014.12); *B33Y 40/10* (2020.01); *B22F 2203/11* (2013.01)

(58) Field of Classification Search

USPC ..................................................... 219/121.35

See application file for complete search history.

(56) References Cited

U.S. PATENT DOCUMENTS

| | | | | |
|---|---|---|---|---|
| 2010/0007062 | A1 | 1/2010 | Larsson et al. | |
| 2012/0211926 | A1 * | 8/2012 | Larsson | B22F 10/362 264/460 |
| 2015/0202717 | A1 * | 7/2015 | Bruck | B22F 10/366 419/53 |
| 2016/0054121 | A1 * | 2/2016 | Snis | B22F 10/28 250/234 |
| 2017/0210073 | A1 * | 7/2017 | Frontera | B33Y 50/02 |
| 2017/0348794 | A1 | 12/2017 | Stumpf | |
| 2018/0154484 | A1 | 6/2018 | Hall | |
| 2018/0186082 | A1 * | 7/2018 | Randhawa | B33Y 50/02 |
| 2018/0345374 | A1 * | 12/2018 | Snis | B22F 12/41 |
| 2019/0054701 | A1 | 2/2019 | Yoshinari | |
| 2021/0122107 | A1 | 4/2021 | Ljungblad | |
| 2022/0097141 | A1 | 3/2022 | Ljungblad | |

FOREIGN PATENT DOCUMENTS

| | | | |
|---|---|---|---|
| JP | 2009-544501 | A | 12/2009 |
| JP | 2018-523011 | A | 8/2018 |
| JP | 2019-007065 | A | 1/2019 |
| RU | 2009106868 | A | 9/2010 |
| RU | 2015153148 | A | 6/2017 |
| WO | WO-2018/219689 | A1 | 12/2018 |
| WO | 2019/185642 | A1 | 10/2019 |

* cited by examiner

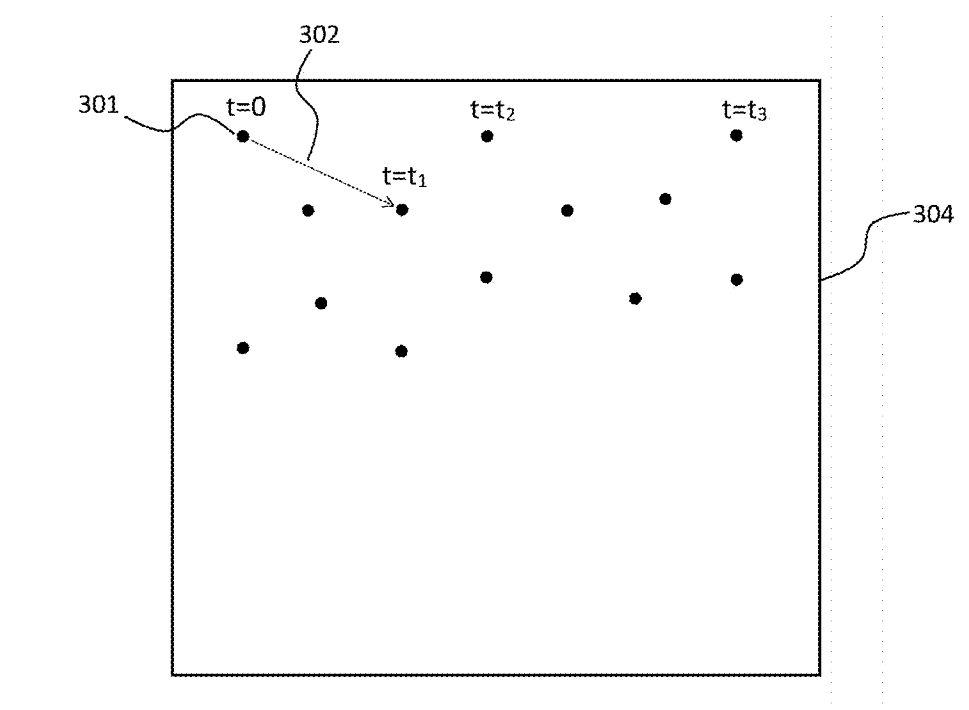
Figure 3
Figure 4
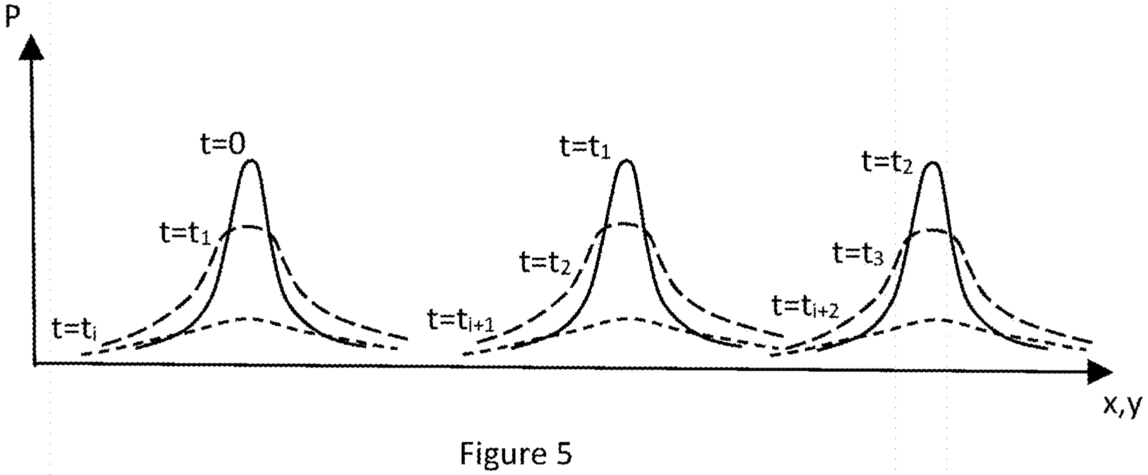
Figure 5

SPOT PREHEATING

CROSS-REFERENCE TO PRIOR APPLICATIONS

This application is a § 371 National Stage Application of PCT International Application No. PCT/EP2020/052167 filed Jan. 29, 2020, which claims priority to U.S. Provisional Application No. 62/797,964 filed on Jan. 29, 2019, both of which are incorporated herein in their entirety.

TECHNICAL FIELD

This invention relates to a method for heating and preparing of a powder layer at a powder bed for subsequent processing by irradiating said powder bed with an electron beam from an electron source, when manufacturing a three dimensional object by fusing layer by layer of a powder material by means of an electron beam.

Problems with Prior Art

In additive manufacturing systems based on electron beam powder bed fusion, it is normally desired to initially preheat the powder bed to prepare proper process conditions for the subsequent fusion and solidification steps. When an electron beam interacts with a powder bed during the manufacturing process, there will be a large number of electrons charging the powder grains in the powder bed. If the electrical conductivity of the powder bed is too low to dissipate such electric charge induced by the electron beam, then the powder bed will accumulate charges up to a critical value where repelling electrostatic forces between the powder grains exceed gravitational forces, causing the powder grains to levitate from the powder bed. Levitated charged powder grains will repel from other levitated charged powder grains, and thus a powder cloud will instantaneously spread throughout the manufacturing chamber. This phenomenon usually leads to an immediate failure and termination of the additive manufacturing process. The manufacturing process normally include heating or preheating of powder and fusion of powder, the main purpose of preheating the powder being to achieve a semi-sintered powder bed for increased electrical and heat conduction. Further the semi-sintered powder bed will also resist levitation and scattering of charged powder better. In prior art preheating of powder beds, the electron beam is usually scanned over the powder bed by continuously moving the electron beam spot over the powder bed with a constant speed and hence a heating trail or track is created at the powder bed. Contrary to this, this invention discloses a method for heating of the powder bed spot by spot.

SUMMARY OF THE INVENTION

This invention relates to a heating method for preparing a powder bed for subsequent processing by irradiating said powder bed with an electron beam from an electron source, said electron source being designed for fast moving of said electron beam to different heating positions at said powder bed, comprising the step: local heating of at least two powder bed heating positions by successive resting of said electron beam at said at least two powder bed heating positions.

In embodiments, a selected region of said powder bed may be heated by several powder bed heating positions at said powder bed for distributing heat over said selected powder bed region.

In embodiments, said several powder bed heating positions form a pattern for maintaining a minimum distance between positions recently heated by the electron beam.

In embodiments, the distance between two consecutive powder bed heating positions may be larger than five times the spot size.

In embodiments, a selected region of said powder bed may be repeatedly heated for distributing heat over said selected powder bed region.

In embodiments, a selected region of said powder bed is heated by several powder bed heating positions at said powder bed for evenly distributing heat over said selected powder bed region.

In embodiments, each consecutive powder bed heating position may be a function of previously deposited electron beam energy.

In embodiments, a pattern of powder bed heating positions is provided at said powder layer bed for maintaining a minimum time until a powder bed heating position is repeatedly heated.

In embodiments, the time resting at a powder bed heating position may be >1 ms or >0.1 ms or preferably >0.01 ms.

In embodiments, said powder bed positions are coordinates in the powder bed plane.

In embodiments, said powder bed may be irradiated with an electron beam from an electron source for maintaining a powder bed process temperature.

In embodiments, said heating method is preferably used for additive manufacturing of a three dimensional object.

In embodiments, the positioning of consecutive heating positions may be selected randomly.

In embodiments, a time dependent mathematical function may be used to determine the positioning of consecutive heating positions.

In embodiments, the positioning of consecutive heating positions may be selected randomly where the probability of the positioning may be determined by a time dependent mathematical function.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF DRAWINGS

In the description of the invention references is made to the following figures, in which:

FIG. 3 shows, a powder bed surface with electron beam heating positions randomly heated at successive times ($t=0$, $t_1$, $t_2$ etc.)

FIG. 4 shows, a graph with the time dependent heat affected area (x,y) at a powder bed from electron heating positions, where T is the temperature.

FIG. 5 shows, a graph with the time dependent heat affected area (x,y) at a powder bed from electron heating positions, where P is the local charging potential caused by the electron beam.

DESCRIPTION AND DISCLOSURE OF THE INVENTION

Figure 1:
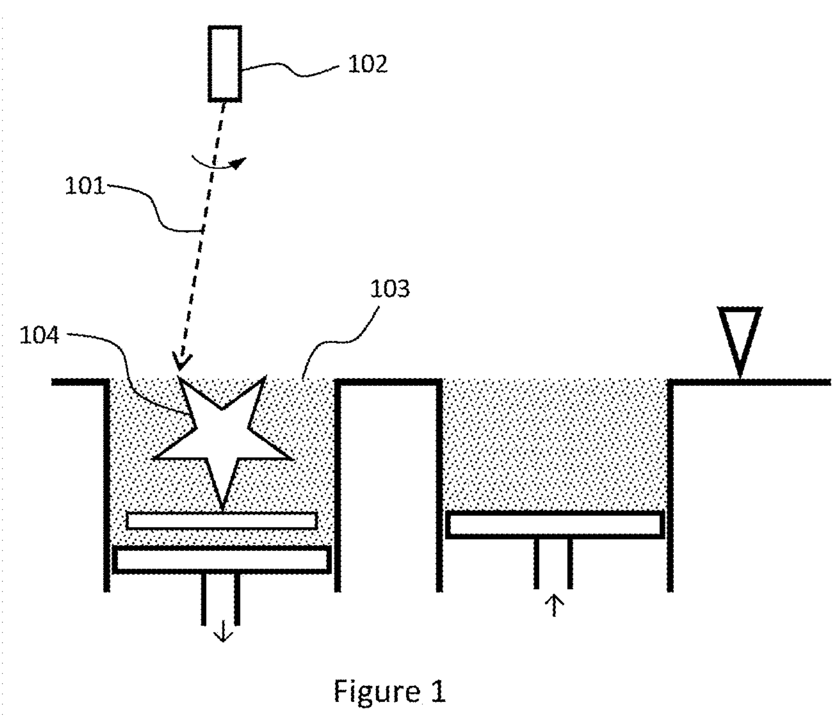
FIG. 1 shows, in a schematic section view, a additive manufacturing system for production of a three-dimensional object by joining powder material layer upon layer in a powder bed.

Additive manufacturing and 3D-printing refer to the process of manufacturing objects from 3D model data by joining powder materials layer upon layer. Powder bed fusion means additive manufacturing or 3D-printing where objects are built up in a powder bed. Thin layers of powder are repeatedly spread by a powder distributor over a powder bed 103 and fused by a beam 101 from an energy source 102 to a predetermined geometry for each layer. The energy source 102 can be for example a laser or an electron gun. Upon finishing a powder bed fusion process, the fused object 104 will be embedded in powder. The powder is removed after completion of the build. In our applications SE1951071-8 (copending) and WO2019185642A1 (published), incorporated here by reference, is also described more about the technology and additive manufacturing.

Electron beam powder bed fusion takes place in vacuum and the electron beam may operate in several process steps: it may preheat the powder layers to a semi-sintered state, it may fuse the powder by melting or by solidifying the powder in the powder layers and it may add additional heat to the powder bed to maintain a predetermined temperature of the powder bed throughout the build. These process steps are carried out under computer control to achieve predetermined quality requirements of the manufactured objects.

A powder bed position 201 is defined as a coordinate in the powder bed plane 204, it is a point or spot having (x,y)-coordinates in the powder bed plane. A position 201 can be heated without scanning or moving the electron beam. Further is "area" defined as a small surface of the powder bed that need some scanning or moving of the electron beam to achieve uniform heating. "Region" 205 is defined as the macroscopic part of the powder bed to be heated. Further we define "sub-region" 203 as a portion of a region 205, larger than area. Hence the size of these definitions are as follows: position<area<subregion<region, where an area is a smaller surface portion and a region is a larger surface portion.

The purpose of this invention is to provide a method for heating of a powder bed by an electron beam. In additive manufacturing systems it is desired to preheat the powder bed in a controlled manner before a region of the top powder layer of the powder bed is fused or melted. By preheating the powder bed a process temperature can be achieved, providing the advantage that less energy need to be irradiated towards the powder bed in the subsequent fusion step to achieve solidified material. Other reasons for preheating can be to dissolve surface oxides from the powder grains. By preheating the powder bed the powder can become semi-sintered for increased electrical conductivity, which is advantageous for improved transport of electrons from the electron bed both in the ongoing preheating step and in the consequent fusion step of the manufacturing process. By preheating the powder bed, the electrical conductivity is increased. By preheating of the powder bed also the thermal conductivity can be increased for more efficient fusion of the powder in subsequent process steps. When the powder bed has been semi-sintered the powder is less prone to be electrostatic charged due to increased electrical conduction in the powder bed, hence the risk for levitation and scattering of charged powder particles will be reduced in the additive manufacturing process.

In an electron beam powder bed fusion process, such as an additive manufacturing process for metal parts, the powder bed is normally preheated for semi-sintering of the powder to reduce the risk for later levitation of charged powder and to increase the electrical conduction in the powder bed for increased transportation of electrons from the powder bed. To save time, it is desired to preheat the powder bed with an efficient heating pattern without risk for levitation and scattering of powder particles due to charging during the preheating. It is normally desired to maximize power per area when preheating the powder bed to achieve a time efficient heating of the powder bed. Once the powder bed has been preheated and the powder has been semi-sintered, the risk for electrostatic levitation and scattering of powder has been reduced.

Preheating of the powder bed before fusion of the powder can be performed in many different ways, for example by electron beam irradiation. Heating by means of an electron beam is an efficient way of heating a powder bed in a vacuum chamber. In the preheating process step the powder bed is often irradiated with more total energy than the total energy used for fusion of powder in the selected region for manufacturing of the three dimensional component.

This invention is based on the understanding that when a powder bed is heated with an electron beam, it is desired to achieve an optimized heating pattern defining the beam movement during the preheating. This heating pattern need to consider time, beam current, beam spot size, beam energy intensity and how long time it takes for the electrons to be transported away from the powder bed.

This invention discloses an optimized spot heating pattern for heating, preheating or semi-sintering of a powder bed. When moving the electron beam spot to subsequent powder bed heating positions, a number of parameters can be considered; distance and time from the previous heating positions, temperature distribution at the powder bed, electrical charge distribution at the powder bed, size and power intensity in the beam spot used for heating. The distance between two consecutive powder bed heating positions may be larger than five times the spot size. Preferably is the distance between two consecutive powder bed heating positions as large as possible, for example >50 mm, to avoid electron charging of the powder in the powder bed. The distance between two consecutive powder bed heating positions depends on the size of the powder bed and may for example be the distance from one side of the powder bed to another.

In an embodiment of this invention a heating method is disclosed for preparing a powder bed 103, 204, 304 for subsequent processing by irradiating the powder bed 103, 204, 304 with an electron beam 101 from an electron source 102. The subsequent processing could for example be fusion of a powder layer in an additive manufacturing process. Said electron source 102 is designed for rapid scanning of the electron beam spot over the powder bed 103, 204, 304 while switching between a high speed or "jumping speed" which is high enough to give negligible local heat and electron transfer to the powder bed 103, 204, 304, and a beam spot holding a heating position 201, 301 to give significant heat transfer to the powder bed 103, 204, 304. The electron beam spot is stationary at the beam heating position on the powder bed 103, 204, 304. The heating method involves rapid scanning 202, 302, or fast moving, of said electron beam spot at jumping speed between several heating positions 201 at the powder bed for heating or preheating of desired regions 205 of the powder bed 103, 204, 304. When the electron beam spot arrives to a new heating position, it rest or holds a fixed position and heats the powder in that position for a predetermined time. Then the electron beam spot moves rapidly with jumping speed to the next heating position, where it again rest or holds a fixed position and heats the powder in that position for a predetermined time. In this way, the electron beam spot is repeatedly scanned, or moved, to new powder bed heating positions until a desired heating pattern of the powder bed has been achieved. After a heating pattern of a selected region 205 of the powder bed 103, 204, 304 is finished, it is possible to repeat heating of the same selected region several times to achieve a desired heating result. By resting the electron beam at a powder bed heating position, the electron beam is holding the powder bed position for a predetermined time and the powder bed will be locally heated.

Figure 2:
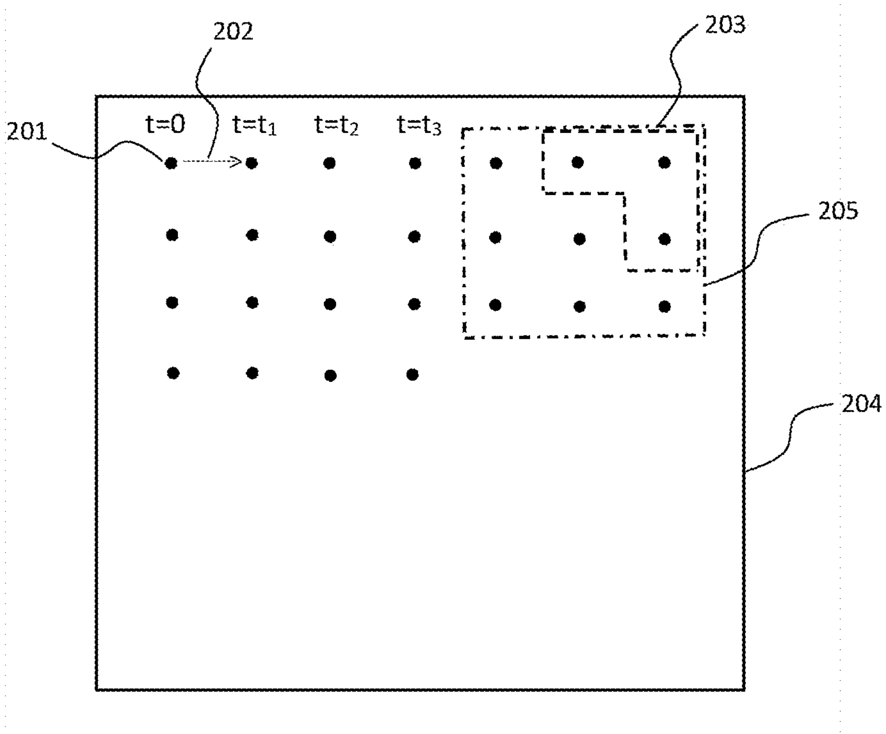
FIG. 2 shows, a powder bed surface with electron beam heating positions heated according to a pattern at successive times ($t=0$, $t_1$, $t_2$ etc.)

As shown in FIG. 2, the predetermined time at each heating position 201 is $\Delta t = t_{n+1} - t_n$. Further in FIG. 4 is shown how the heat will spread at three heating positions over time (t). The electron beam spot has a distribution with a spot size interfering with the top surface of the powder bed 103, 204, 304. As seen in FIG. 4 the heat will spread over the surface (x,y) over time (t), hence the temperature (T) will change according to the graphs in the figure.

Further, in FIG. 5 is shown how the electron charging will spread and dissipate at three heating positions over time (t). As seen in FIG. 5 the charge will spread over the surface (x,y) over time (t) but FIG. 5 also shows how the electron induced charging will reduce due to dissipation of charge through the underlying powder bed after the heating of the three heating positions. The dissipation leads to a charge situation that allows further heating in the region of the three heating positions after adequate amount of time has been allowed to pass during which the electron beam 101 is performing heating in other heating positions on the surface 204.

In another embodiment, a heating method is disclosed for preparing a powder bed 204 by heating small areas at each heating position. The electron source may be designed for scanning of the electron beam spot over the powder bed 103, 204, 304 while switching between at least two different scanning speeds, one high speed or "jumping speed" which is high enough to give negligible heat transfer and charging potential to the powder bed 204, and one low speed or "heating speed" which is low enough to give significant heat transfer to the powder bed 103, 204, 304. Said jumping speed can typically be higher than 1000 m/s and said heating speed can typically be lower than 50 m/s. The heating speed can be zero, implying that the electron beam spot is stationary at a certain location on the powder bed. The heating method involves rapid scanning 202, or fast moving, of said electron beam spot at jumping speed between several heating positions 201, or areas, at the powder bed for heating or preheating of desired regions 205 of the powder bed 103, 204, 304. When the electron beam spot arrives to a new heating position, it slows down to the heating speed and heats the powder at a limited area of the heating position for a predetermined time. The limited area of the heating position is typically in the size range of a diameter of 5 mm. The size of the subregion is typically in the size range of a diameter of 10 mm and region in the size range of a diameter of 15 mm. Then the electron beam spot moves rapidly with jumping speed to the next heating position, where it again slows down to heating speed and heats the powder for a predetermined time. In this way, the electron beam spot is repeatedly scanned, or moved, to new powder bed heating positions until a desired heating pattern of the powder bed has been achieved. After a heating pattern of a selected region of the powder bed is finished, it is possible to repeat heating of the same selected region several times to achieve a desired heating result.

After a heating sequence of a selected region has been finished, a fusion process step can be performed and a consecutive layer of powder distributed. The thickness of a consecutive powder layer is normally selected for enabling heating and fusion of the powder layer for desired material properties in the manufactured object. It is also possible to add further process steps, such as postheating, etc.

The desired heating pattern may be developed for distributing heat over a selected region of the powder bed. The electron beam spot is rapidly travelling between several heating positions while maintaining a minimum distance between successive positions to evenly heat the selected region of the powder bed. It is also advantageous to keep a minimum distance between successive positions for avoiding to build up excessive electrical charge in local areas of the powder bed. As mentioned previously, excessive electrical charge build-up could lead to levitation and scattering of powder from the powder bed. It is desired to consider a number of different parameters when developing the heating pattern, such as; distance to previous heating positions, amount of energy and electrical charge deposited at a heating position, time duration at a heating position, time required for beam movement between heating positions, time required for the heat and electrical charge to dissipate in the powder bed and beam power and spot size of the electron beam irradiating the powder bed.

It is also desired to avoid scanning or moving the electron beam over recently heated positions retaining a high electrical charge, when moving the electron beam between different heating positions. This is to prevent said electrostatic levitation and scattering of powder.

It is normally desired to achieve an even temperature distribution at the selected region of the heated powder bed. For this reason it can be advantageous to add more heat to certain subregions 203 of the powder bed where there is a higher degree of cooling during other process steps, to achieve an even temperature distribution of the selected region of the powder bed.

The powder bed is normally formed as a plane having a flat top surface and the heated powder bed positions are coordinates in this powder bed plane. The powder bed is irradiated with an electron beam from an electron source for maintaining a powder bed process temperature.

This invention discloses a heating method for preparing a powder bed for subsequent processing by irradiating said powder bed with an electron beam from an electron source. The electron source is designed for fast moving or scanning of the electron beam over the powder bed to different heating positions or heating areas at the powder bed. The method comprises local heating of several powder bed heating positions or heating areas by successive rapid electron beam positioning at said several powder bed heating positions.

The scanning of the electron beam to different positions forms a pattern for maintaining a minimum distance between recently visited positions, to achieve an efficient preheating of the powder bed prior to fusion of the powder by the electron beam. A selected region 205 (or regions) of said powder bed is repeatedly heated for distributing heat over said selected powder bed region. This region (or regions) is selected with respect to the need of heating; it might not be necessary to heat the entire powder bed or it might be of interest to heat some subregions 203 more than others.

The powder bed may be irradiated with an electron beam from an electron source for maintaining a powder bed process temperature. In some cases it can be important to evenly distribute heat over said selected powder bed region, to achieve good process conditions. Consecutive powder bed heating positions can be determined by a function of deposited electron beam energy. A pattern of powder bed heating positions can be provided at the powder layer bed for achieving a minimum time span during which a powder bed is heated to a predetermined temperature. If the time between repeated heating of adjacent heating positions is less than a minimum time, there is a risk for levitation and scattering of charged powder from the powder bed.

In a further embodiment of this invention the heating method can be used for additive manufacturing of a three dimensional object by an electron beam. The size, shape and intensity of the electron beam spot at the powder bed can be varied for achieving a desired heating of the selected region of the powder bed.

In another embodiment, shown in FIG. 3, the positioning of consecutive heating positions 301 at the powder bed 304 may be selected randomly. The electron beam is moved 302 with high speed to the next beam heating position. Alternatively, the positioning of consecutive heating positions may be selected randomly but where also the probability of the positioning may be determined by a time dependent mathematical function such as for example a two dimensional gaussian distribution or a two dimensional hyperbolic distribution.

In another embodiment, a time dependent mathematical function such as for example a least square fit function may be used to determine the positioning of consecutive heating positions at the powder bed to achieve an efficient preheating of the powder bed and avoid scattering of powder.

The object of this invention is to provide an efficient heating method for a powder bed and preparing the powder for subsequent process steps in the manufacturing process. This object is achieved by the method defined in the independent claim. The dependent claims contain advantageous embodiments, variants and further developments of the invention.

What is claimed is:

1. A heating method for heating a powder bed to fuse the powder by melting by irradiating said powder bed with an electron beam from an electron source, said electron source being designed for fast moving of said electron beam to different heating positions at said powder bed, comprising local heating of at least two fixed powder bed heating positions to fuse the powder by successive holding of said electron beam spot at said at least two fixed powder bed heating positions according to a heating pattern, comprising the following steps:

holding the electron beam spot at one of said at least two fixed powder bed heating positions for a first predetermined time to heat the powder to fuse the powder in that position;

moving the electron beam spot rapidly with a jumping speed to another of said at least two fixed powder bed heating positions, wherein said electron beam spot is moved in a powder bed plane from one powder bed heating position where it is held to another powder bed heating position where it is held again at a location having a different x- and y-coordinate within the powder bed plane from the one powder bed heating position; and holding the electron beam spot at the another of said at least two fixed powder bed heating positions for a second predetermined time to heat the powder to fuse the powder in that position, wherein the heating pattern of subsequent fixed powder bed heating positions at the powder layer bed achieves a minimum time span during which the powder bed is heated, wherein time between repeated heating of two subsequent and adjacent fixed powder bed heating positions according to the heating pattern is not less than a minimum time required for electrical charge to dissipate so as to avoid levitation and scattering of charged powder from the powder bed.

2. The method according to claim 1, wherein a selected region of said powder bed is heated by several powder bed heating positions at said powder bed for distributing heat over said selected powder bed region.

3. The method according to claim 2, wherein said several powder bed heating positions form a pattern for maintaining a minimum distance between positions previously heated by the electron beam.

4. The method according to claim 1, wherein the distance between two consecutive powder bed heating positions is larger than five times the spot size.

5. The method according to claim 1, wherein a selected region of said powder bed is repeatedly heated for distributing heat over said selected powder bed region.

6. The method according to claim 1, wherein a selected region of said powder bed is heated by several powder bed heating positions at said powder bed for evenly distributing heat over said selected powder bed region.

7. The method according to claim 1, wherein each consecutive powder bed heating position is related to previously deposited electron beam energy through a mathematical function.

8. The method according to claim 1, wherein a pattern of powder bed heating positions is provided at said powder layer bed for maintaining a minimum time until a powder bed heating position is repeatedly heated.

9. The method according to claim 1, wherein the time resting at a powder bed heating position is >0.01 ms.

10. The method according to claim 1, wherein the time resting at a powder bed heating position is >0.1 ms.

11. The method according to claim 1, wherein said powder bed positions are coordinates in the powder bed plane.

12. The method according to claim 1, wherein said powder bed is irradiated with the electron beam from the electron source for maintaining a powder bed process temperature.

13. The method according to claim 1, wherein said heating method is used for additive manufacturing of a three dimensional object.

14. The method according to claim 1, wherein the positioning of consecutive heating positions is selected randomly.

15. The method according to claim 1, wherein a time dependent mathematical function is used to determine the positioning of consecutive heating positions.

16. The method according to claim 1, wherein the positioning of consecutive heating positions is selected randomly where the probability of the positioning is determined by a time dependent mathematical function.

17. A heating method for heating a powder bed to fuse the powder by melting by irradiating said powder bed with an electron beam from an electron source, said electron source being designed for moving of said electron beam between different heating positions at said powder bed, comprising the steps:

local heating of at least two fixed powder bed heating positions in a powder bed plane to fuse the powder, wherein the electron beam spot is repeatedly moved to new powder bed heating positions until a predetermined heating pattern of a selected region of the powder bed has been achieved, said heating pattern including successive holding of said electron beam at each fixed powder bed heating position wherein when the electron beam spot arrives to a new heating position, a fixed position is held and the electron beam heats the powder in that position for a predetermined time to fuse the powder, and wherein the electron beam spot subsequently moves rapidly with a jumping speed to the next heating position, where again a fixed position is held and the electron beam heats the powder in that position for a predetermined time to fuse the powder, wherein each next heating position has a different x- and y-coordinate within the powder bed plane from the previous heating position, and wherein time between repeated heating of adjacent heating positions is not less than a minimum time required for electrical charge to dissipate so as to avoid levitation and scattering of charged powder from the powder bed.

18. The heating method according to claim 17, wherein moving the electron beam spot to subsequent powder bed heating positions includes considering at least one of the parameters: distance and/or time from the previous heating positions, temperature distribution at the powder bed, electrical charge distribution at the powder bed, size and/or power intensity in the beam spot used for heating.

19. The method according to claim 17, wherein the distance between two consecutive powder bed heating positions is larger than five times the spot size.

20. The method according to claim 17, wherein each consecutive powder bed heating position is related to previously deposited electron beam energy through a mathematical function.

21. The method according to claim 17, wherein consecutive powder bed heating positions are determined by a function of deposited electron beam energy.

22. The method according to claim 17, wherein consecutive powder bed heating positions are heated for a predetermined time without performing a fusion process.

23. The method according to claim 17, wherein consecutive powder bed heating positions are heated for a predetermined time to perform a fusion process.

24. The method according to claim 17, wherein the time resting at a powder bed heating position is >0.01 ms.

25. The method according to claim 17, wherein the time resting at a powder bed heating position is >0.1 ms.

26. The method according to claim 17, wherein a time dependent mathematical function is used to determine the positioning of consecutive heating positions.

27. A heating method for preheating a powder bed before a region of a top powder layer of the powder bed is fused or melted, by irradiating said powder bed with an electron beam from an electron source, said electron source being designed for moving of said electron beam to different heating positions at said powder bed, comprising the step:

local preheating of at least two fixed powder bed heating positions by successive holding of said electron beam spot at said at least two fixed powder bed heating positions according to a heating pattern determined based on electrical charge distribution at the powder bed, wherein the heating pattern reduces the risk for levitation and scattering of charged powder particles during the preheating comprising the following steps: holding the electron beam spot at one of said at least two fixed powder bed heating positions for a first predetermined time to preheat the powder in that position;

moving the electron beam spot rapidly with a jumping speed to another of said at least two fixed powder bed heating positions in a powder bed plane;

holding the electron beam spot at the another of said at least two fixed powder bed heating positions for a second predetermined time to preheat the powder in that position, repeating the holding of the electron beam spot at fixed powder bed heating positions until the heating pattern is achieved, wherein each subsequent one of said at least two fixed powder bed heating positions is in a different x- and y-coordinate within the powder bed plane from each previous one of said at least two fixed powder bed heating positions, and wherein the heating pattern of powder bed heating positions is provided at the powder layer bed for achieving a minimum time span during which the powder bed is heated to a predetermined temperature wherein said jumping speed is high enough to give negligible heat transfer and charging potential to the powder bed.

* * * * *